United States Patent [19]

Valkanas

[11] Patent Number: 5,137,563
[45] Date of Patent: Aug. 11, 1992

[54] CONTROLLED RELEASE FERTILIZER

[76] Inventor: George N. Valkanas, 14 Konstantinoupoleos Street, Maroussi, Athens, Greece, 15122

[21] Appl. No.: 646,227
[22] Filed: Jan. 28, 1991
[51] Int. Cl.⁵ .............................................. C05G 3/10
[52] U.S. Cl. ................................... 71/64.07; 71/64.11
[58] Field of Search ............... 71/11, 27, 64.07, 64.08, 71/64.11

[56] References Cited
U.S. PATENT DOCUMENTS
3,252,786  5/1966  Bozzelli et al. .................... 71/64.07

Primary Examiner—Ferris Lander
Attorney, Agent, or Firm—Stevens, Davis, Miller & Mosher

[57] ABSTRACT

A biologically controlled release coating for fertilizer comprises from 60 to 97 weight % of a waxy substance and from 40 to 3 weight % or a rosin or dimerized rosin having at least 70 weight % of resinic acids having conjugated double bonds and dimerized rosin with its derivatives thereof. Such coatings have a resin character to giver fertilizer prills which do not break on handling yet break down in response to the biological needs of the plant.

8 Claims, No Drawings

CONTROLLED RELEASE FERTILIZER

FIELD OF THE INVENTION

The present invention relates to coating compositions Particularly the present invention relates to coating compositions useful in the controlled release of contents to the ambient environment. The coating compositions of the present invention are not intended for internal or medicinal uses but rather are intended for external uses where chemicals are released to the ambient environment such as controlled release fertilizers, plant nutrients, and minerals.

BACKGROUND OF THE INVENTION

Controlled release fertilizers have been known for a long time. Controlled release fertilizers seek to address several issues. Generally the first issue that controlled release fertilizers seek to address is to release the fertilizer at a time when the plant most needs the fertilizer. As a result there is less fertilizer in run off water in the spring and less pollution. However in some instances it is desirable to have only one application of a fertilizer which will be released in a sustained manner over a long period of time. This approach is used for example in lawn care and in the care of golf courses.

One approach to the creation of controlled or sustained release fertilizers was to coat urea prills with a barrier coat which eroded with time. Typically the coating was sulphur although in some instances coatings of concrete have been used. This approach is fairly unsophisticated. The fertilizer such as urea leaches out of the prill through pores in the coating. Over time the coating splits and cracks open. While the approach may address the issue of fertilizer loss in the spring it does not adequately provide a sustained release over long periods of time and in a manner responsive to the biological needs of the ambient environment.

U.S. Pat. No. 3,252,786 issued May 24, 1966 and assigned to the Sun Oil Company discloses a controlled release fertilizer. The patent teaches that the fertilizer is coated with a composition comprising a waxy substance and a component selected from the group consisting of: (1) polymerized wood rosin; (2) hydrogenated wood rosin; (3) mono and polyhydric alcohol esters of polymerized, hydrogenated, and unmodified wood rosin; and (4) polyvalent metal salts of polymerized, hydrogenated and unmodified wood rosin. (Claim 1) The patent stresses the treatment of the rosin to remove the double bond in the molecule. Furthermore the patent does not stress any particular source of rosin as being better than any other source of rosin. The patent fails to suggest that rosin from the species pinus halepensis is particularly useful in the production of controlled release fertilizer.

None of the art provides a controlled release coating which interacts with the biology in the ambient environment to provide a sustained release of fertilizer in an amount required by the environment.

The rosin acids in the coating composition of the present invention provide both a high resin character to the coating and a biological control release. The resin character makes the coated product stable, nonbreakable and non crystallizing. The biological activity causes the coating to break down in the soil at a rate responsive to the demand of plants. The coatings composition contains products of natural origin possessing high biodegradability in the soil.

SUMMARY OF THE INVENTION

The present invention introduces a coating composition which provides a biologically controlled release of the coated contents to the ambient environment said composition comprising from 60 to 97 wt. % of one or more waxy components and from 40 to 3 wt. % of a rosin mixture comprising from 100 to 60 wt. % of rosin having conjugated double bond resinic acids in an amount of at least 70 wt. % and dimerized rosin and its products or derivatives thereof.

The present invention also provides fertilizer, plant nutrients, minerals, or other ingredients, or mixtures thereof coated with the above coating composition.

The present invention further provides the above coated compositions in a mixture with a lightly crosslinked highly water absorbent polymer.

DETAILED DESCRIPTION

Rosin is a complex mixture of carboxylic acid compounds. The compounds have a basic structure or configuration of three joined six membered rings with essentially the same substituents. However the rings are unsaturated and there are double bonds within the molecule. If the double bonds are conjugated the molecules are abietic acid, neoabietic acid, palustric acid and levopimaric acid. If the compounds do not contain a conjugated double bond they are generally named as pimaric acid compounds (e.g. pimaric acid, isopimaric acid, santaropimaric acid) except for levopimaric acid.

The rosin, dimerized rosin or a mixture thereof used in accordance with the present invention introduce into the coating a strong resinous character and biological controller release. To obtain these effects the resin should comprise a rosin, or a mixture of rosins having at least 70, preferably 70 to 80, most preferably 75 weights of one or more rosin or resinic acids having conjugated double bond and dimerized rosins and derivatives thereof. Conjugated double bonds tend to be more susceptible to oxidation whether promoted by ultraviolet light or enzyme action present in the soil. In contrast to the disclosure of U.S. Pat. No. 3,252,786 the present invention seeks rosins, dimerized rosins or a mixture thereof which have a high content of conjugated double bonds. In contrast U.S. Pat. No. 3,252,786 teaches the use of treatments to minimize unsaturation, including oxidation which renders the rosin biologically inactive and possible toxic to soil micro organisms. A particularly useful source of rosin having a high content of conjugated double bonds for use in the present invention is derived from the genus pinus. A particularly preferred species is the species pinus halpensis. The rosin from this tree is particularly useful as it tends to contain less than about 20, more preferably less than 15 wt. % pimaric acids. Another suitable rosin is Chinese rosin. However, other treated rosins may be used such as "DYMEREX" (trademark of Hercules Power Company) which is believed to be a dimerized rosin. Generally the preferred dimerized rosin should have a softening point as determined by the ring and ball method of not less than about 120, preferably greater than 125° C.

Dimerized rosin useful in accordance with the present invention may be prepared by dissolving a rosin having the required conjugated double bond content in an organic solvent such as toluene. Sulphuric acid is slowly added to the solution with stirring and cooling.

The treatment may proceed for several hours, then the solution is allowed to cool and separate. The upper organic layer contains the dimerized rosin and the lower layer contains the acid. The organic and acid layers are separated and the solvent is driven off. The resulting dimerized rosin should have a softening temperature as determined by ASTM E 28-67 (ring and ball method) of at least 120°, preferably from 125° to 140° C.

The other ingredient in the controlled release coating of the present is a waxy substance. The nature of the waxy substance their chemical and biological behaviour in the coating are also important to the invention. The waxy substance may be a paraffin wax, either linear or microcrystalline; a polyethylene or a polyethylene oxide, a fat or fatty acid, cellulose products and derivatives thereof and similar products. The wax should have a similar biodegradability to the rosin component and not significantly reduce the hardness of the coating. Preferably the waxy substance will have a melting point from about 65° to 150° C., more preferably from 70° to 130° C.

The wax and the rosin having conjugated double bond resinic acids in an amount of at least 70 wt. %, dimerized rosin or a mixture thereof are mixed in a wt. % 95:5 to 60:40. Preferably the wax and rosin, dimerized rosin or a mixture thereof are used in a wt. % of 80:20 to 97:3.

The rosin and wax mixture may be prepared by melting the wax and blending in the rosin, dimerized rosin or a mixture thereof. Typically the melt will be at a temperature from about 100° C. TO 150° C. In accordance with the present invention the substance to be coated may also be added to the melt, provided it will not be adversely affected by the treatment. In cases where the substance may degrade other coating procedures, such as spraying, may be used to coat the substance.

The substances which may be coated with the coating compositions of the present invention include many types of substances such as fertilizers, nutrients, minerals, herbicides, insecticides and other chemicals which are useful in small quantities released over a period of time. The present is particularly useful with fertilizers. Without being bound by theory it is believed that the coating composition of the present invention is "biologically activated". That is the coating is degraded by the microbes in the ambient environment. If a plant is healthy there will be a normal amount of microbes in the soil relative to the size of the root system (e.g. root mass). The size of the root system is a function of the size of the plant. Larger plants will degrade the coating at a faster rate and will be provided with nutrients at a rate determined by the microbial activity in the soil.

There is no limitation on the type of fertilizer which may be used in accordance with the present invention. Suitable fertilizers include those comprising nitrogen, potassium and phosphorus: usually termed NKP fertilizers.

The ratio of coating compound to active substance may vary over a wide range. Typically the coating forms less that 15, preferably less than 10, most preferably from about 5 to 1 wt. % based on the total weight of the coated substance. As noted above the substance to be coated may be melt blended with the coating. Generally the coated substance will be in the form of spheres, granules or prills. However there may be instances where it is desirable to form larger blocks of substance. In these cases the coating will actually form a matrix in which is embedded the active substance.

In a preferred aspect of the present invention the substance to be coated is a fertilizer. The controlled release fertilizer is particularly effective when it is used in combination with a lightly crosslinked highly water absorbent polymer. Several types of such polymers are known. The lightly crosslinked highly water absorbent polymer may be a polymamide or a sulphonated vinyl aromatic compound.

The polymer may be a lightly crosslinked polyacrylamide such as acrylamide or methacrylamide. The polymer may be a neutralized salt such as an alkaline or alkaline earth metal salt, preferably potassium or sodium, or an ammonium salt of a sulphonated polystyrene, styrene-acrylonitrile copolymer (SAN) or a co or terpolymer of styrene butadiene and an acrylate such as methyl methacrylate or methyl acrylate, or ethyl acrylate or ethyl methacrylate. The polymer may also be toughened. That is it may contain domains of a rubbery polymer such as a high impact polystyrene (HIPS) or a styrene acrylonitrile copolymer grafted onto a butadiene rubber (ABS).

For the sake of simplicity lightly crosslinked highly water absorbant polymers will be refered to as hydrogels in the present patent specification. The weight ratio of controlled release fertilizer to hydrogel may vary over a broad range. Typically the weight ratio of controlled release fertilizer to hydrogel may range from 80:20 to 20:80, preferably from 60:40 to 40:60. Without being bound by theory it is believed that the hydrogel helps maintain a water level in the soil conducive to both micro organisms and to the growth of the plant.

In addition to holding water in the soil the hydrogel may act as as an ion exchange agent to reduce the formation of insoluble salts of the fertilizer. Generally there appears to be a synergy when fertilizers having a controlled release coating in accordance with the present invention are used in conjunction with a hydrogel.

The present invention will be illustrated by the following non-limiting examples in which parts are parts by weight (e.g. grams) and % is wt. % unless other wise indicated.

EXAMPLE 1

Rosin from the species pinus halepensis was analyzed for content of various types of rosin acids. The rosin had an abietic acid content of 35%, a neoabietic acid content of 15%, a palustric acid content of 17.5% and a levopimaric acid content of 12.5% giving a total of rosin acids having conjugated double bonds of 80%. The rosin was dissolved in toluene to form a 25 to 30% solution. To the solution was added concentrated sulphuric acid, with stirring and cooling. Over 2 hours the temperature rose to 40°-45° C. then fell to about 30° C. The organic and acid phases separated and the organic phase was drawn off. The solvent was removed to yield a hard dimerized rosin having a softening point of from 125° to 130° C.

In a similar manner various rosins were analyzed for content of rosin acids having conjugated double bonds. Additionally the rosin acids were dimerized as described above. The content of rosin acids having conjugated double bonds and the softening temperature (ASTM E28-67) of the dimerized rosin is set forth in Table 1.

TABLE 1

| Rosin Type | % Rosin Acids having Conjugated Double Bonds | Softening Temperature of a Dimerized Rosin |
|---|---|---|
| Wood Rosin | 55 | 100–105° C. |
| Gum Rosin | 58 | 110–112° C. |
| Pinus Silvester | 60 | 110–112° C. |
| Pinus Brutia | 60 | 110–112° C. |

In addition to the above rosins the commercially available product Dymerex (trademark of Hercules Power Company) was analyzed for content of rosin acids having conjugated double bonds. The content was 95% and the softening point was 130°–135° C.

EXAMPLE 2

Samples of Various ingredients useful in the coatings of the present invention were placed in soil having a moisture content maintained at 40%. The samples were left in the soil for 90 days. At 10, 30, 60, and 90 days the samples were weighed to determine the percent of original material in the sample which had not degraded. This test illustrates the biodegradability of the components of the coatings of the present invention. The results are set forth in Table 2.

TABLE 2

| Component | Days 10 | 30 | 60 | 90 |
|---|---|---|---|---|
| Dimer Pinus Halepensis | 76 | 40 | 25 | 6 |
| Dymerex | 85 | 50 | 34 | 16 |
| Linear Paraffin | 83 | 60 | 54 | 41 |
| Branched Paraffin | 90 | 82 | 73 | 61 |
| Polyethylene Wax | 86 | 73 | 58 | 43 |
| Polyethylene Oxide Wax | 90 | 84 | 72 | 63 |

The table shows that the most biologically degradable component in the coating composition is the dimerized rosin from the species pinus halepensis.

EXAMPLE 3

A series of controlled release fertilizers were prepared. The fertiliser was uniform and the coat weight of controlled release coating on the fertilizer was as uniform as possible. The coating composition comprised waxy substances and varying amounts of dimer of rosin from the species pinus halepensis. The rosin dimer was used in an amount of 3, 6 and, 10 wt. % of the coating composition.

The growing medium was sand. To the sand was added a hydro gel of the type disclosed in Greek Patent 86.0636. The hydro gel was used in excess to maintain constant supply of moisture in the soil. The only nutrients available in the growing medium were due to the controlled release fertilizer.

Seedling trees were planted in the soil and the percent consumption of fertilizer by the trees was measured at various times. The results are set forth in Table 3.

TABLE 3

| Days | % Dimerized Rosins in Coating of 3% | 6% | 10% |
|---|---|---|---|
| 10 | — | 8 | 13 |
| 20 | — | 9 | 13 |
| 30 | 20 | 31 | 49 |
| 50 | 32 | 48 | 72 |
| 70 | 48 | 68 | 98 |
| 90 | 61 | 77 | — |

Table 3 shows that it is possible to control the rate of release of controlled fertilizer by controlling the percent of dimer of rosin from the species pinus halepensis in the coating on the fertilizer.

Furthermore the experiment shows that the fertilizer release rate is such as to most directly meet the needs of the growing plant.

What is claimed is:

1. A coating composition which provides a biologically controlled release of the coated contents to the ambient environment said composition comprising from 60 to 97 wt. % of one or more waxy components and from 3 to 40 wt. % of rosin selected from the group consisting of rosin obtained from the species Pinus Halepensis and Chinese rosin, said rosin having a conjugated double bond resinic acids in an amount of from 70 to 80 wt. %, and dimerized rosin having a softening point of at least 120° C.

2. A coating composition according to claim 1, wherein said one or more waxy components is selected from the group consisting of linear or branched paraffin waxes, polyethylene waxes, polyethylene oxide, fat, fatty acids and cellulose and derivatives there of having a melting point from 70° to 130° C.

3. A coating composition according to claim 2, wherein said waxy component is present in an amount from 80 to 97 wt. %.

4. A coating composition according to claim 3, wherein said rosin has a conjugated double bond resinic acid content of about 75 wt. %.

5. A controlled release fertilizer coated with from 1 to 5 wt. % of a coating composition according to claim 4.

6. A fertilizer composition in accordance with claim 4, further comprising from 20 to 80 wt. % of a lightly crosslinked highly water absorbent polymer.

7. A controlled release fertilizer coated with from 1 to 15 wt. % of a coating composition according to claim 4.

8. A fertilizer composition in accordance with claim 7, further comprising from 20 to 80 wt. % of a lightly crosslinked highly water absorbent polymer.

* * * * *